US008200430B2

(12) United States Patent  
Trautenberg et al.

(10) Patent No.: US 8,200,430 B2  
(45) Date of Patent: Jun. 12, 2012

(54) METHOD AND APPARATUS FOR PROVIDING INTEGRITY INFORMATION FOR USERS OF A GLOBAL NAVIGATION SYSTEM

(75) Inventors: Hans L. Trautenberg, Neumarkt (DE); Veit Oehler, Ottobrunn (DE); Marcel Abele, Aalen (DE); Bruno Lobert, Pechabou (FR)

(73) Assignee: European Space Agency, Paris (FR)

( * ) Notice: Subject to any disclaimer, the term of this patent is extended or adjusted under 35 U.S.C. 154(b) by 942 days.

(21) Appl. No.: 11/663,158

(22) PCT Filed: Sep. 17, 2005

(86) PCT No.: PCT/EP2005/010038  
§ 371 (c)(1), (2), (4) Date: Jan. 16, 2008

(87) PCT Pub. No.: WO2006/032422  
PCT Pub. Date: Mar. 30, 2006

(65) Prior Publication Data  
US 2008/0288167 A1  Nov. 20, 2008

(30) Foreign Application Priority Data  
Sep. 20, 2004  (EP) .................................... 04022307

(51) Int. Cl.  
*G01S 1/00* (2006.01)  
*G01S 5/02* (2010.01)

(52) U.S. Cl. ........ 701/468; 701/469; 701/473; 701/476; 701/478; 342/357.395; 342/357.58

(58) Field of Classification Search .................. 701/213, 701/214, 468, 469, 473, 476, 478; 342/357.2, 342/357.3, 357.62, 357.31, 357.395, 357.58, 342/386, 357.21, 357.22, 357.23; 455/12.1, 455/13.1  
See application file for complete search history.

(56) References Cited

U.S. PATENT DOCUMENTS

| | | | | |
|---|---|---|---|---|
| 6,088,571 A * | 7/2000 | Kane et al. | .................... | 455/12.1 |
| 6,204,806 B1 * | 3/2001 | Hoech | ...................... | 342/357.58 |
| 6,667,713 B2 * | 12/2003 | Green et al. | ............. | 342/357.31 |
| 6,782,330 B1 * | 8/2004 | Clark | .............................. | 702/66 |
| 6,847,893 B1 * | 1/2005 | Lupash | ......................... | 701/213 |
| 6,850,187 B1 * | 2/2005 | Clark | ..................... | 342/357.395 |
| 7,400,292 B2 | 7/2008 | DiLellio | | |
| 2005/0083232 A1 * | 4/2005 | Trautenberg | .................. | 342/386 |
| 2005/0093739 A1 * | 5/2005 | DiLellio | .................. | 342/357.06 |

OTHER PUBLICATIONS

Dixon, Charles, GNSS Local Component Integrity Concepts, 2003, Journal of Global Positioning Systems, vol. 2, No. 2, pp. 126-134.*

(Continued)

*Primary Examiner* — Khoi Tran  
*Assistant Examiner* — Jamie Figueroa  
(74) *Attorney, Agent, or Firm* — Crowell & Moring LLP (57) ABSTRACT

In a method for providing integrity information for users of a global navigation system, which comprises several space vehicles like satellites transmitting information to a device for position detection, the transmitted information comprises first information from the global navigation system about the accuracy of a signal in space error SISE of a faulty space vehicle, and second information whether or not the global navigation system assesses the faulty space vehicle as faulty. The invention is based on the assumption how exact a fault can be detected, so that performance the global navigation system can be increased; and no unfounded assumption is used which improves the quality of service.

15 Claims, 7 Drawing Sheets

OTHER PUBLICATIONS

Hollreiser, Martin, Galileo Receivers-Challenges and performance, 2004, European Space Agency, Navigation Department, 34$^{th}$ European Microwave Conference, Amsterdam, pp. 321-324.*

Blomenhofer et al., Performance Analisys of GNSS Global and Regional Integrity Concepts, 2003, Proceedings of ION GPS, Navpos, pp. 1-11.*

Werner, W., Towards Global Integrity, 2001, International Symposium on Kinematic Systems, Navx, pp. 1-8.*

Carlos Hernandez Medel, Laura Perea I Virgili, Alvaro Mozo Garcia, Juan Ramon Martin Piedelobo and Miguel M. Ramey Merino: "SISA Computation Algorithms and their applicability for Galileo Integrity" ION GPS 2002, Sep. 27, 2002, pp. 2173-2184, XP002316876 PORTLAND (p. 2176, left-hand column, line 23—p. 2183).

Wolfgang Werner, Thoedor Zink and Joerg Hahn: "Galileo Integrity Performance Assessment Results and Recommendations" ION GPS 2002, Sep. 27, 2002, pp. 21185-2195, XP002316877 PORTLAND (the whole document).

W. Werner, N. Lemke, I. Deuster, U. Rossbach: "Integrity Investigations within the European Galileo System Test Bed (GSTB)" ION GPS 2003, Sep. 12, 2003, pp. 2478-2486, XP002316878 PORTLAND (the whole document).

M. Hollreisere, P. Erhard, P. Lorenzi, C.S. Dixon: "Galileo User Segment Overview" ION GPS 2003, Sep. 12, 2003, pp. 1914-1928, XP002316875 PORTLAND (p. 1919, left-hand column—p. 1921, left-hand column).

Marco Falcone, Manfred Lugert: "Risk Mitigation in the Ground Mission Segment using the Galileo System Test Bed", Mar. 4, 2004, BERN (30 pages).

Helmut and Eduarda Blomenhofer, Walter Ehret, Arian Leonard: "GNSS/Galileo Global and Regional Integrity Performance Analysis" ION GNSS 17$^{th}$ International Technical Meeting of the Sat3ellite Division, Sep. 21-24, 2004, Long Beach, CA, pp. 2158-2168.

* cited by examiner

METHOD AND APPARATUS FOR PROVIDING INTEGRITY INFORMATION FOR USERS OF A GLOBAL NAVIGATION SYSTEM

This application is a national stage of PCT International Application No. PCT/EP2005/010038, filed Sep. 17, 2005, which claims priority under 35 U.S.C. §119 to European Patent Application No. 04 022 307.5 filed Sep. 17, 2005, the disclosure(s) of which is (are) expressly incorporated by reference herein.

FIELD OF THE INVENTION

The invention relates to a method for providing integrity information for users of a global navigation system, to a device for position detection by means of a global navigation system, and to a method for determining the integrity risk of information disseminated from space vehicles in a global navigation system.

BACKGROUND OF THE INVENTION

In a global navigation system based on satellites, the accurate detection of a specified position with regard to the earth requires local as well as global integrity. Integrity means on one hand the capability of the global navigation system to warn users within a predetermined time if parts of the system should not be used for their determined usage; on the other hand, integrity means also the trust a user can put in the reliability of the information received from the system, particularly the accuracy of the information.

Warnings are necessary if single satellite signals for the navigation contain defects. For example, such defects occur if a navigation signal of a satellite is created at the wrong time (clock or time correction error) or at the wrong place (faulty satellite orbit). These defects have an influence on the apparent run length of the signal from a satellite to a receiver and, therefore, have an strong impact on the accuracy of navigation. Time errors can also be considered as run length errors. Defects or errors are also named as signal in space error, abbreviated SISE. The name signal in space comes from the task of a global navigation system based on satellites or a satellite navigation system which disseminates signals in space in order to allow a detection of the position of a receiver of the signals.

Known concepts of integrity are based on the assumption that it is possible to perfectly detect errors. Known non-regional integrity concepts are the Wide Area Augmentation System (WAAS) and the European Geostationary Navigation Overlay Service (EGNOS). With these concepts, it is assumed that errors can always be detected. However, this assumption is not always correct and, therefore, the accuracy of navigation can be reduced.

OBJECT OF THE INVENTION

Therefore, it is an object of the present invention to provide a method and an apparatus for providing integrity information for users of a global navigation system which are not based on the assumption that errors can always be detected.

SUMMARY OF THE INVENTION

The invention relates to a method for providing integrity information for users of a global navigation system, which comprises several space vehicles like satellites transmitting information to a device for position detection, wherein the transmitted information comprises a first information from the global navigation system about the accuracy of a signal in space error (SISE) of a faulty space vehicle and a second information whether or not the global navigation system assesses the faulty space vehicle as faulty.

In contrast to known methods such as wide area augmentation systems (WAAS) or European Geostationary Navigation Overlay Service (EGNOS) for providing integrity information in a global navigation system like Galileo (which are based on the assumption that faults can be always detected), the invention is based on the assumption how exact a fault can be detected. Thus, the performance the global navigation system can be increased. Also, no unfounded assumption is used, which improves the quality of service.

In an embodiment of the invention, the first information comprises information about the quality of a signal in space (SIS) broadcast by the space vehicles, which is called signal in space accuracy (SISA), and information about the accuracy of a monitoring of the signal in space SIS broadcast by the space vehicles by a ground segment of the global navigation system, which is called signal in space monitoring accuracy (SISMA).

Furthermore, the second information comprises information about a signal in space SIS broadcast by the space vehicles that should not be used, which is called integrity flag (IF).

Typically, an navigation message is disseminated to the device for position detection which includes values of the SISA.

Also, a integrity message can be disseminated to the device for position detection which includes a table containing a value of the SISMA and an integrity flag IF for each SIS.

In a global navigation system like Galileo, the navigation and the integrity message are updated each 30 seconds.

According to a further aspect, the invention relates to a device for position detection by means of a global navigation system which comprises several space vehicles transmitting information to the device for determining the position of the device in space, wherein the device comprises receiving means for receiving an integrity information provided according to the inventive method described above, processing means for calculating an integrity risk from the received first and second information and further information, and alert means for raising an alert if the calculated integrity risk is larger than an allowed integrity risk.

The processing means can be adapted for calculating the integrity risk for a given alert limit which is the maximum allowed position deviation for which no alert has to be raised.

For the calculation of the integrity risk it should be assumed that all distribution used for the calculation are Gaussian distributions.

In order to achieve accurate results, the further information used for the calculation of the integrity risk can comprise the relative geometry between the device for position detection and a space vehicle, error budgets for the signal in space SIS including propagation errors, reception errors and errors of the SIS broadcast by the space vehicles, and integrity flags IFs.

For errors of the SIS broadcast by the space vehicles it can be assumed that for a non fault-free space vehicle the distribution of the difference between the error of the SIS broadcast by the space vehicles and an integrity flag threshold is overbound by a Gaussian distribution with standard deviation signal in space monitoring accuracy SISMA.

The device can be adapted for calculating the integrity risk as the sum of the horizontal integrity risk $P_{IntRisk,H}$ and the vertical integrity risk $P_{IntRisk,V}$.

The invention also relates to a method for determining the integrity risk of information disseminated from space vehicles in a global navigation system which provides integrity information by means of a method according to the above described inventive method, comprising the following steps:

checking that the integrity information received for every integrity data stream is the integrity information generated by the integrity function of the ground infrastructure;

selecting out of the redundant and positively checked integrity data-streams the integrity data stream to be used;

determining from the selected and positive checked integrity information and the navigation information which signals are valid;

computing the integrity risk at the alert limit for the critical operation period wherein only valid signals are considered;

computing the number of critical space vehicles for the critical operation period wherein only space vehicles that provide valid signals are considered; and generating an alert for the user which indicates whether the received information should be used for position detection or not.

Especially, the integrity information generated by the integrity function of the ground infrastructure is signed so that it can be validated by a receiver.

Further advantages and features of the invention will become apparent from the following description of preferred embodiments of the invention.

Other objects, advantages and novel features of the present invention will become apparent from the following detailed description of the invention when considered in conjunction with the accompanying drawings.

BRIEF DESCRIPTION OF THE DRAWINGS

The present invention will now be described, by way of example, with reference to the accompanying drawings, in which.

DETAILED DESCRIPTION OF PREFERRED EMBODIMENTS OF THE INVENTION

In the following description, the invention is explained as application in Galileo which will be an independent, global European controlled satellite-based navigation system.

The Galileo Global Component will comprise a constellation of satellites monitored and controlled by a Ground Segment which will also provide the capability to detect satellite or system malfunctions and broadcast real-time warnings (integrity messages) to users.

The Galileo Global Component will provide a number of satellite-only navigation services:

Open Services (OS) providing navigation & timing;

Safety-of-Life Services (SoL) providing integrity messages, incorporated into the navigation data messages of Open Service signals;

Commercial Services (CS) providing dissemination of commercial ranging and data signals by Galileo satellites;

Public Regulated Services (PRS) providing navigation & timing by means of independent, restricted-access navigation signals.

Other components of the Galileo System will provide Local Services to improve performances (e.g., integrity) on a local basis.

The Galileo system will also provide support to Search-and-Rescue (SAR) services.

In addition, Galileo will support External Regional Integrity Services (ERIS) by disseminating, over selected Galileo satellites, integrity data generated by independent, external regional integrity service providers.

According to the most demanding requirements of the SoL service this will drive the overall Galileo integrity allocation. Therefore the following SoL characteristics are summarized.

Frequencies and Signals

Figure 1:
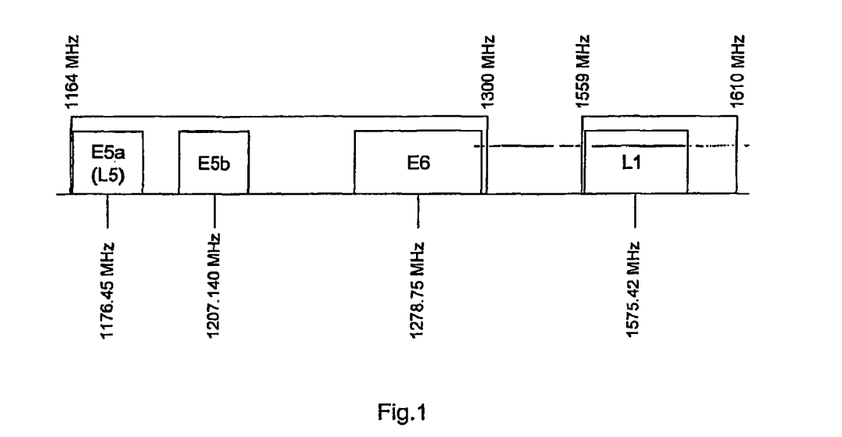
FIG. 1 shows the frequency plan of the Galileo global navigation system.
Figure 2:
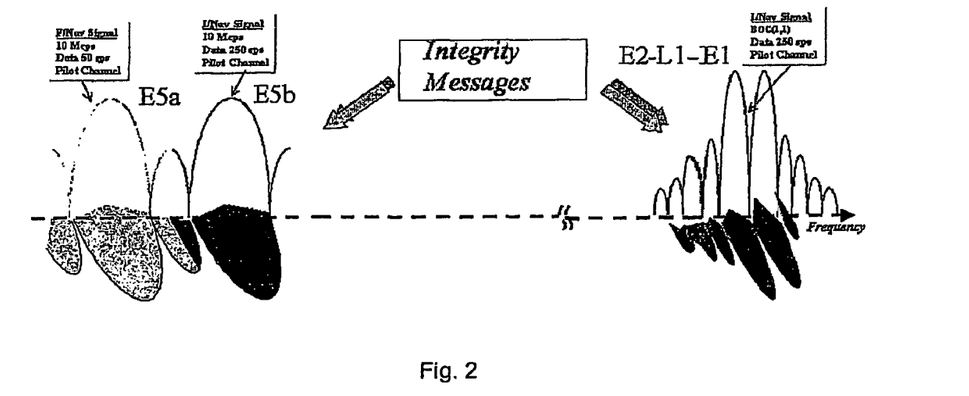
FIG. 2 shows the navigation signals used in Galileo which support Safety-of-Life (SoL) services.

The Galileo Navigation Signals are transmitted on four frequencies as indicated in FIG. 1. The four frequencies are E5a, E5b, E6 and L1 that have been selected from the bands allocated to the Radio Navigation Satellite Service (RNSS) by the ITU Radio Regulations. The signals that are supporting the SoL service are illustrated in FIG. 2.

Galileo Infrastructure

The Galileo Space Segment will comprise a constellation of 27 operational satellites plus three in-orbit (inactive) spare satellites in medium-Earth orbit (MEO). Each operational satellite will broadcast a set of navigation signals carrying clock synchronization, ephemeris, integrity and other data, depending on the particular signal. A user equipped with a suitable receiver with good visibility of the sky will be able to receive around 11 Galileo satellites to determine his position to within a few meters.

The Galileo Ground Segment will control the complete Galileo constellation, monitor the satellite health, and upload data for subsequent broadcast to users via the mission uplink stations (ULS). The key elements of this data such as clock synchronization, ephemeris and integrity messages will be calculated from measurements made by a worldwide network of Galileo Sensor Stations (GSS).

Categories of Services

Integrity for Global Navigation Satellite Systems is a measure of the trust, which can be placed in the correctness of the positioning information supplied to the user by the receiver.

Integrity includes the ability of a system to provide timely and valid warnings to the users (alerts). The main problem in providing integrity to different classes of Galileo users is to determine what is considered to be a safe service, as this depends on the type of intended operation in each application domain. The following parameters are traditionally used to define whether or not the service is safe for a given operation:

Maximum tolerable error in the position domain without providing a warning, called the Alert Limit (AL).

Maximum tolerable time between the Alert Limit being exceeded and the warning being received, called the Time-to-Alert (TTA).

Probability that a warning is not provided within the Time-to-Alert after the Alert Limit has been exceeded, called the Integrity Risk (IR).

The acceptable values of the Alert Limit, Time-to-Alert and Integrity Risk all depend on the intended operation.

The Galileo system will provide a high demanding level of integrity for its navigation signals. The global integrity concept will accommodate the needs of a variety of user communities requiring different services, in terms of signal combinations, and different levels of integrity in terms of Integrity Risks and Alert Limits.

The SoL service will provide integrity information at global level based upon the monitoring of L1 and E5b Open Service signals. The SoL service will allow operations in different application domains, not only transport (air, land, maritime and rail) but also timing and other critical applications, with a wide range of requirements in terms of integrity performances which impose different constrains at system level.

Galileo performances are specified at user level (i.e. end-to-end performances) assuming the use of an adequate receiver (a "standard" receiver) under specific reference environmental and operational conditions.

The consultation of user communities has led to the identification of the following three categories of integrity requirements:

Level A: shall cover operations requiring horizontal and/or vertical guidance with short exposure time and with very stringent dynamic conditions, for example, in the aviation domain approach operations with vertical guidance (APV II). It also covers some rail (train control/monitoring) and road applications.

Level B: shall cover operations of longer duration requiring lower accuracy, which in the aviation domain range from en-route to NPA (Non Precision Approach).

Level C: shall cover maritime operations including ocean navigation, costal navigation, port approach, restricted waters and inland waterways, which can require high vertical accuracy.

The following table presents the driving integrity related performance requirements for the various user levels as well as the mapping of Galileo signals to these configurations.

| | Level A requirements | Level B requirements | T Level C requirements |
|---|---|---|---|
| Integrity Risk | 3.5e−7 per 150 sec | 1.0e−7 per 1 h | 1.0e−5 per 3 h |
| Continuity Risk | 1.0e−5 per 15 sec | 1.0e−4 to 1.0e−8 per 1 h | 3.0e−4 per 3 h |
| Availability of Service | 99.5% | 99.5% | 99.5% |
| TTA | 6 sec | 10 sec | 10 sec |
| HAL/VAL | 40 m/20 m | 556 m/NA | 25 m/NA |
| Dual Frequency E5a + L1 or E5b + L1 | Yes | Yes | Yes |
| Single Frequency L1 or E5b | No | Yes | No |
| Coverage | World land masses | Global | Global |

The Level A requirements had been taken into account for the system design work and have been driving the system performance and the requirement allocations accordingly. It is to be noted that the system requirements [RD-7] require a HAL of 12 m.

Error Sources

The errors affecting the position determination using a satellite navigation system are the combination of the following two factors.

The errors affecting each individual satellite range measurement: these errors are a function of the prediction time of the satellite orbit and clock evolution, so that short-term predictions with high update rates will keep these errors small.

The geometry of the satellites as seen by a given user: this geometry is deterministic for a particular time and location and can be computed by each individual user.

The purpose of the integrity mechanism for Galileo is to ensure that each individual user is provided with signals which are safe for its intended operation and is warned in due time if this condition cannot be met at one point in time. However, the Galileo System Operator can only be held responsible for some of the error sources affecting the users. It is therefore important to identify the different categories of error sources and to explain how each of these error components can be addressed by the overall integrity scheme. There are three main categories of error sources as follows.

1. Errors attributable to the Galileo signal generation: this category includes all errors that result from the radio frequency characteristics of the signals broadcast from the Galileo satellites or from the navigation data contained in the radio frequency signals. The main contributors in this category are the clock and ephemeris errors and satellite onboard hardware.

2. Errors due to the signal propagation: throughout its path from the satellite broadcast antenna to the user receiver antenna, the signal is disturbed by several phenomena affecting its propagation. Ionospheric delays, tropospheric delays, multipath and radio frequency interference will be the main contributors in this category.

3. Errors due to the user receiver: the user receiver will also contribute to the overall performance of the system. Thermal noise will affect the range measurements in the receiver, as will the power level of the received signals.

The way to handle the contribution to integrity of these three categories of errors will be very different. The Galileo integrity data will allow users to be protected against the first category of errors. Dual-frequency operation will permit users to correct for ionospheric delays. Propagation error modelling will allow users to be protected from errors due to tropospheric delays. The implementation of user equipment barriers will protect users from excessive interference or multipath.

Galileo Integrity Concept

Monitoring Ground Network

According to the described ground infrastructure consisting of Galileo sensor stations (GSS) and mission uplink stations (ULS), a global network can be used to monitor the satellite behavior and provide user information respectively.

The number of visible GSS from each satellite drives the ground network and the corresponding number of necessary stations. Present system-level analyses show that the required SoL integrity performance can be guaranteed with a network of around 35 GSS.

Therefore a good performance is guaranteed to derive a useful integrity monitoring concept.

Integrity Concept

A first and typical option to provide data to the user for more accurate measurements to derive a useful integrity concept could be the transmission of differential data, using the global GSS network.

According to the invention, a more adequate concept which is independent from the user location is to monitor each satellite itself and transmit the corresponding behavior (e.g., estimated signal in space accuracy or "Not OK" information if something is wrong with the satellite) to the user. Thus, the user receives direct information about the estimated performance of each satellite (clock and orbit).

Taking all transmitted information into account the user can calculate the integrity risk and decide if he's allowed to start his operation according to the invention.

SISA, SISMA, IF Threshold

Galileo has the possibility to monitor the signal-in-space (SIS) within the Ground Segment using the measurements of the GSSs. With the known positions of the GSSs the actual position of the space vehicle (SV) and with this the maximum error on the range (the signal-in-space-error, SISE) can be estimated.

If we have a look at the prediction of the SISE distribution, we assume that this distribution—not necessarily Gaussian—can be over-bounded by a non-biased Gaussian distribution with the minimum standard deviation called signal-in-space-accuracy (SISA). With this distribution the difference between the actual four-dimensional position (orbit and clock) of the SV and the predicted four-dimensional position on the navigation message is described (cf. FIG. 3).

Figure 3:
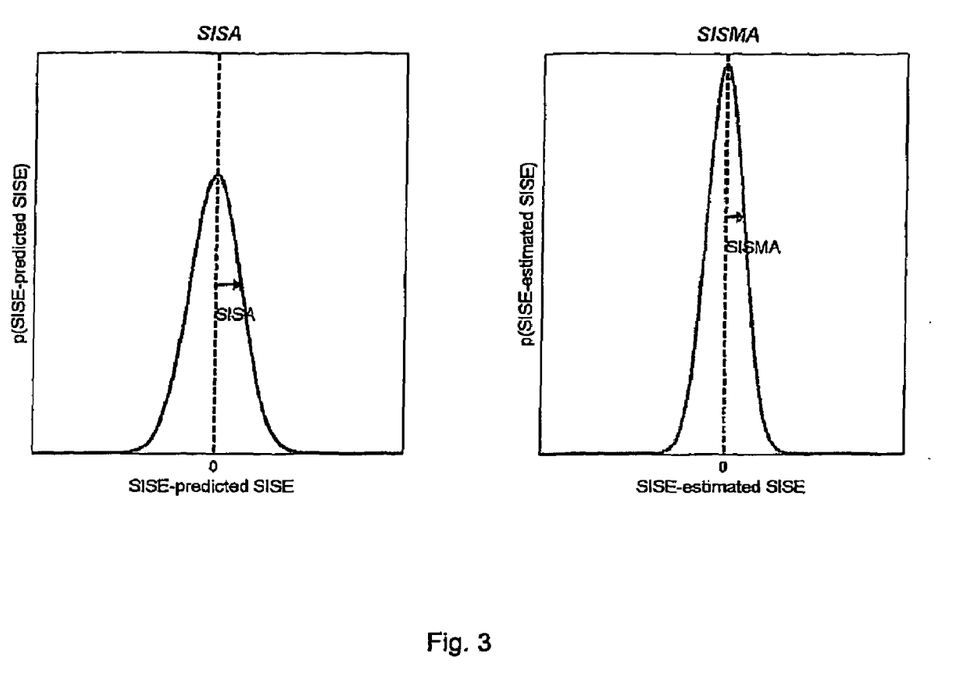
FIG. 3 illustrates the signal in space accuracy (SISA) and the signal in space monitoring accuracy (SISMA)

The estimation of the SISE is also an erroneous process. The assumption made in this case is that the distribution of the actual SISE around the value of the estimated SISE can be described with a Gaussian distribution with the standard deviation called signal-in-space-monitoring-accuracy (SISMA). The determination of the SISMA values is dependent on the geometry between the available GSSs and the SVs. Thus, the difference between the true SISE and the estimated SISE can be described with this Gaussian distribution with the standard deviation SISMA (cf. 3).

Within the Galileo Integrity concept the system estimates the SISE using the measurements of the GSSs to detect faulty satellites. If the estimated SISE for a satellite is larger than a certain threshold, the satellite will be flagged "don't use". But if we recall the erroneous process of the SISE estimation, it has to be considered that the estimated SISE of a satellite might be smaller than the threshold while the actual true SISE is larger than the threshold. In this case it is talked about a Missed Detection.

The Integrity Flag Threshold TH has to be selected in a way that the probability of a False Alarm is smaller than a required limit. A False Alarm occurs whenever a satellite is flagged as "Don't Use" though it is not necessary to do so. This means, whenever the estimated SISE ($SISE_{est}$) is larger than the threshold TH, while the actual true SISE is smaller than the threshold TH, there will be a False Alarm.

Integrity Alert Function

The Galileo integrity function is the service of the system to provide the users with timely warnings if the system shall not be used for navigation.

Furthermore it relates to the trust the user can have in this service. This trust is measured by the integrity risk, which is the probability that the user should have been warned without having been warned. This is called Hazardous Misleading Information (HMI).

The system integrity function provides integrity information to the users. It contains only information on:
 the quality of the SIS broadcast by SVs (i.e. SISA)
 the accuracy of the monitoring by the Ground Segment of the SIS broadcast by the SVs (i.e., SISMA)
 the SIS broadcast by SVs that shall not be used (i.e. integrity flag and integrity flag threshold)

From this information the user can derive his individual integrity risk according to the invention. This integrity risk is always calculated for a given alert limit. The alert limit is the maximum allowed position deviation for which no alert has to be raised. Whenever the derived integrity risk at the alert limit is larger than the allowed integrity risk, the user equipment shall raise an alert.

The computation of the integrity risk at the alert limit can be simplified if all distributions needed for the computation can be assumed to be Gaussian distributions. The approach to justify this assumption is to over-bound the distribution with a Gaussian distribution whenever possible and necessary.

The following terms needed to compute the integrity risk at the alert limit are explained again.

SISE:
 SISE is the maximum error of the SIS in the range domain caused by the space vehicle (SV), the SV payload, and the navigation message (i.e., ephemeris data, clock, etc.).

SISA:
 As the SISE distribution need not be a Gaussian distribution, the methodology of overbounding is applied to describe the SISE distribution with an overbounding Gaussian distribution.
 The SISE distribution is characterized by SISA, which is a prediction of the minimum standard deviation of a Gaussian distribution that overbounds the SISE distribution for fault-free SIS.

SISMA:
 As the SISE cannot be measured directly, one has to estimate the SISE from measurements.
 The estimation of SISE results in an estimated SISE (eSISE).
 The difference between SISE and eSISE has a distribution. This distribution shall be overbounded by a Gaussian distribution with a standard deviation called SISMA. This shall be a minimal value of the standard deviation.

Integrity flag and integrity flag threshold:
 If the eSISE for a SIS is larger than the integrity flag threshold for this SIS, the integrity flag for this SIS is set to not ok.
 The integrity flag threshold can be computed from the SISE distribution, the distribution of the difference between SISE and eSISE, and the allowed False Alert probability.

The user computes his integrity risk from the following items, which are fix or broadcast by the SIS:
 Relative geometry between user and SVs
 Error budgets for the SIS which consists of
  the propagation errors
  the reception errors
  the errors of the SIS broadcast by the SVs
 integrity flags The relative geometry between the user and the SVs is calculated from the estimated position of the user and the ephemeris of the SVs.

For the distribution of the propagation and reception errors agreed models exist. These models might be fed by additional measurement of the receiver.

For the error of the SIS broadcast by the SVs for the specific users it is assumed that:

For fault-free SVs the distribution of the error of the SIS broadcast by the SVs is overbound by a Gaussian distribution with standard deviation SISA.

For the non fault-free SVs the distribution of the difference between the error of the SIS broadcast by the SVs and the integrity flag threshold is over-bound by a Gaussian distribution with standard deviation SISMA.

The integrity flag information is to exclude SIS from the navigation and integrity solution.

Integrity Dissemination

According to the described integrity concept the following information should be disseminated to the user.

Navigation Message: beside the normal navigation message content, the message will include the SISA values for the satellites as well and will be updated about each 30 sec.

Integrity Message: likewise the navigation message the integrity message will be updated about each 30 sec, including the complete integrity table consist of the SISMA value and IF for each SIS.

Checksum and connectivity status: the integrity checksum and connectivity status (how integrity has been derived) will be updated about each 1 sec.

Alerts: if necessary alerts can be transmitted in real time (about each 1 sec) for all satellites.

User Integrity Concept

Assumptions

The assumptions made for the derivation of the user integrity equation are summarized as follows:

In a "Fault-Free-Mode" the true SISE for a satellite is zero-mean Gaussian distributed with a standard deviation SISA (SISE~N(0,SISA)). Therefore the SISA confidence level is assumed equal to 1.

In general faulty satellites will be detected and will be flagged "don't use".

For each instance in time one satellite of those flagged "OK" is considered to be faulty but not detected ("Failure Mode"). For this satellite the true SISE is Gaussian distributed with the estimated SISE value $SISE_{est}$ as expectation value and the standard deviation SISMA ($SISE\sim N(SISE_{est}, SISMA)$), i.e. the SISMA confidence level is likewise assumed equal to 1. But as the estimated SISE $SISE_{est}$ will not be known for the user, a pessimistic estimate for the $SISE_{est}$ is the threshold TH. Therefore the distribution for the true SISE of a faulty satellite, which is not flagged "don't use", is Gaussian with expectation value TH and standard deviation SISMA (SISE~N(TH,SISMA)).

The probability that more than one satellite at each instance in time is faulty but not detected is negligible for the user equation. Multiple and common failures are allocated in another branch of the integrity tree including not detected SISA and SISMA failures (cf. 0). Therefore these events are not allocated to the user integrity equation.

With these assumptions the user is able to determine the integrity risk of his position solution at any global location.

User Integrity Risk Calculation at the AL

According to the invention, there are two major concepts to calculate the integrity for the user:

1. either it can be calculated which error magnitude has to be assumed to be compliant with a given integrity risk value (protection level concept);
2. or the integrity risk can be directly calculated at the Alert Limit (AL).

For the first concept fixed allocations have to be established for each failure mechanism (e.g., 2% horizontal and 98% vertical like WAAS allocation) and horizontal protection level (HPL) respectively vertical protection level (VPL) result.

Furthermore, user geometries which lead to high HPL are different from those which lead to high VPL values. In case of WAAS this does not have to be considered due to the fact that 2% are allocated for the horizontal case. Furthermore, WAAS has compared to Galileo less stringent availability requirements, so that the decrease in availability due to this fixed split can be tolerated.

In case of Galileo, four failure mechanisms should to be considered: horizontal, vertical and for each of them fault-free and one undetected error.

According to the invention, the integrity risk for each failure mechanism can be calculated at the alert limit (AL) and to compare the sum of all four contributions with the required integrity risk. This approach corresponds to the second concept.

User Integrity Equation

As above described in detail the information available at user level to compute the integrity risk is:

Integrity Flag,

SISA value for each satellite,

SISMA value for each satellite, and

Threshold via SISA and SISMA.

Once the distribution of the error in the desired reference frame is known (Gaussian over-bounding distributions with SISA respectively SISMA), both in the faulty and the fault free conditions appointed to the user equations, it is very straightforward to derive the associated integrity risk.

Therefore the error distributions for the vertical (one-dimensional Gaussian distribution) and horizontal (Chi-Squared distribution with two degrees of freedom) case need to be derived and the corresponding integrity risk can be computed by analyzing the integral for both distributions with the given limits (Alert Limits).

The combined user integrity risk can be calculated by $$P_{HMI}(VAL, HAL) = P_{IntRisk,V} + P_{IntRisk,H} \qquad (\text{eq. 0-1})$$

$$= 1 - \text{erf}\left(\frac{VAL}{\sqrt{2} \cdot \sigma_{u,V,FF}}\right) + e^{-\frac{HAL^2}{2\xi_{FF}^2}} +$$

$$\sum_{j=1}^{N}\left(P_{fail,sat_j} \cdot \frac{1}{2}\left(1 - \text{erf}\left(\frac{VAL + \mu_{u,V}}{\sqrt{2} \cdot \sigma_{u,V,FM}}\right)\right)\right) +$$

$$\frac{1}{2}\left(1 - \text{erf}\left(\frac{VAL - \mu_{u,V}}{\sqrt{2} \cdot \sigma_{u,V,FM}}\right)\right) +$$

$$\sum_{j=1}^{N}\left(P_{fail,sat_j} \cdot \left(1 - \chi^2_{2,\delta_{u,H}} cdf\left(\frac{HAL^2}{\xi_{FM}^2}\right)\right)\right)$$

Key Performance Requirements

Extensive service volume simulation (SVS) analyses demonstrated that the overall required integrity and availability performances can be met if the SISMA values are below the following specification for nominal and degraded modes.

|  | Nominal Mode | Degraded Mode |
| --- | --- | --- |
| SISA | 85 cm | 85 cm |
| SISMA | 60 cm | 120 cm |
| GMS Availability | 94.73% | 99.96% |
| SSgt State Probability | 94.38% | 5.33% |
| User Elevation Angle | 10° | 10° |

Hereby the system is in "nominal mode" if the ground segment is nominal and the SSgt is nominal (27 SIS available) and in "degraded mode" if the ground segment AND/OR the SSgt is degraded (26 SIS).

It should be further highlighted that these key performance requirements have been derived by Service Volume Simulations with a user elevation angle of 10°. This means that SIS have just be used above this masking angle.

System Performance Allocation

According to the overall integrity concept the required integrity, continuity, and availability specifications should be allocated at System level down to Segment requirements. This top down allocation is typically realized by using a so called allocation tree for each requirement.

In the following the high-level top-down allocation for integrity, continuity, and availability will be outlined, taking the described integrity concept into account.

Integrity Allocation Tree

Top Level Allocation

The above presented equation to calculate the integrity risk at user level represents the following modes and failure mechanisms that can lead to an integrity event.
1. All satellites are fault-free mode
2. The worst satellite that is flagged as "OK" is faulty (at the threshold with SISMA)

This can be allocated as "Fault-Free or Single SIS HMI" contribution to the specified overall HMI (Hazardous, misleading information) risk in the position domain. This Top Level Hazard concerns the provision of a position solution under the conditions that the HMI Probability in any integrity critical operation period exceeds the tolerated value and the user is not warned within the specified TTA.

Beside the mentioned user integrity equation

"Fault-Free or Single SIS HMI": this event represents the HMI situation created when either all the signals used in the position solution perform nominally (Fault Free Stochastic) or at most one signal affected by an undetected failure is used in the position solution (1 SIS Failure Due to System). The latter failure does not include the case of single SISA failure and single SISMA failure because this is allocated in the below described "Multiple SIS Failure" branch.

further contributions to the overall integrity risk that might lead to integrity events are "Integrity dissemination failure due to non local effects": this branch covers all events where errors in the dissemination of integrity information result in an HMI in the position domain. These events can only occur when at least one SIS is failing.

"Multiple SIS failures": this branch represents the condition where at least one SIS is failing due to either navigation data determination failure or multiple independent signal failures.

"Receiver failures": the receiver contribution is not part of the system allocation and is specified in the system requirements separately. However, for a better understanding it is illustrated in the following figures.

Figure 4:
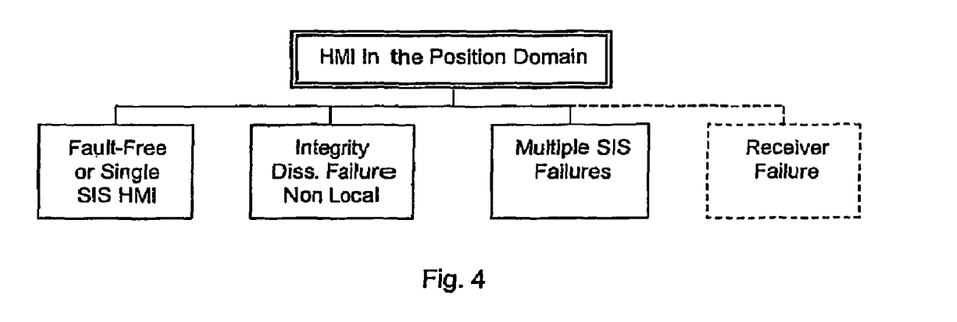
FIG. 4 illustrates the high-level integrity allocation in Galileo.

FIG. 4 illustrates the high-level integrity allocation.

In the following sections the single integrity branches are briefly described to outline the failure mechanisms that are covered by the integrity allocation.

Fault-Free or Single SIS HMI

Figure 5:
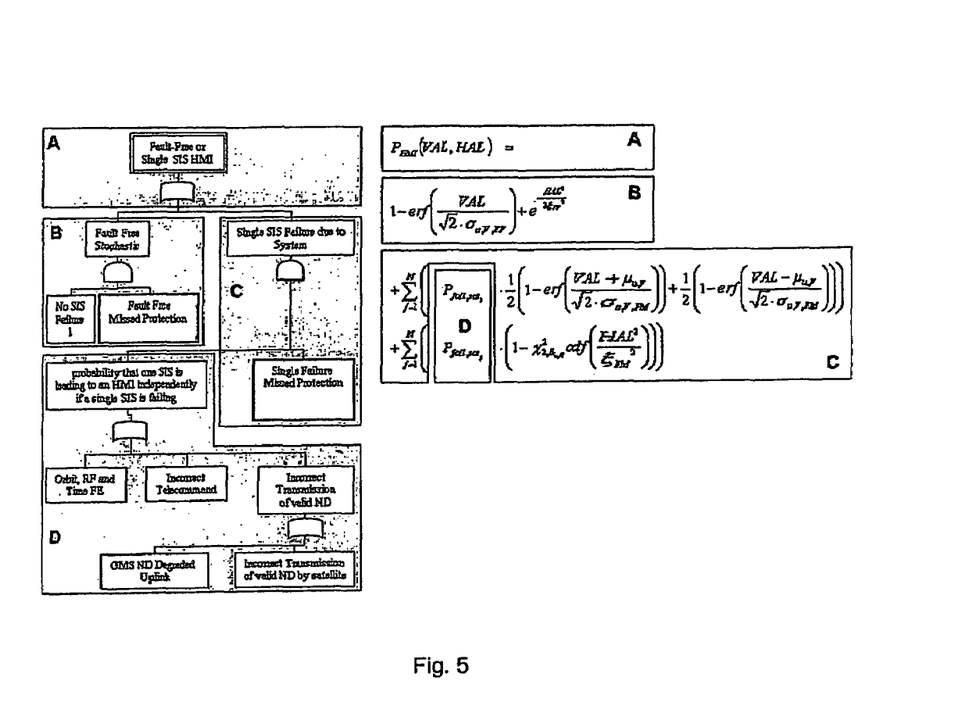
FIG. 5 shows a block diagram of the user branch for calculating a integrity risk.

The left branch is allocated to the described user equation and is further split down as illustrated in FIG. 5.

Each part can be directly found in the derived user equations (cf. to 0). The two boxes "Fault Free Missed Protection" and "Single Failure Missed Protection" in section B respectively C in FIG. 5 on the left side represent the allocation between the horizontal and vertical fault-free and faulty failure mechanisms.

The user has to calculate its integrity risk at the alert limit and he's allowed to start his operation if the calculated value is below the "Fault-Free or Single SIS HMI" allocation (section A).

Dissemination Failure

The branch "Integrity Dissemination Failure Non Local" covers all events where errors in the dissemination of integrity information result in an HMI in the position domain. These events can only occur when at least one SIS fails.

Figure 6:
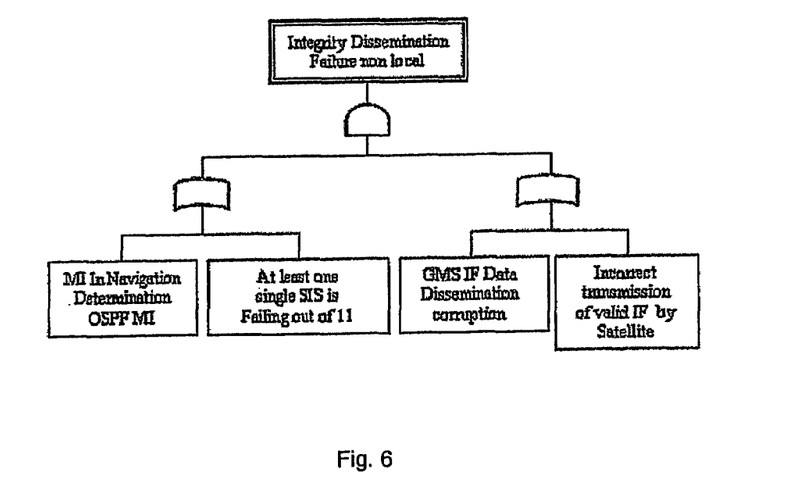
FIG. 6 shows a block diagram of the dissemination failure branch.

FIG. 6 illustrates the further split down to segment level for the dissemination failure branch.

As mentioned above this branch covers all events where an HMI in the position domain occurs according to a failure in the integrity information dissemination. Therefore it represents the hazardous situations created when at least one of the SIS used in the position estimation is failing (1 out of 11; 11 is the maximum number of visible satellites) and if the dissemination has failed caused by the GMS or the satellite.

In case of OSPF misleading information (OSPF MI) the OSPF output contains misleading information (i.e. SISA not properly bounding the predicted orbit and clock accuracy) for one or more Satellites.

Multiple SIS Failures

The branch for multiple SIS failures finally covers all events where multiply independent or common failures lead to an HMI in the position domain. Therefore these events might occur if either independent single SIS fails simultaneously or if an undetected failure for SISA or SISMA leads to common SIS failures.

Furthermore it should be highlighted that this branch covers beside the multiple failures also the common failures for at least one SIS. Thus, this branch is also covering the undetected SISA and SISMA failures which are not included in the user equation.

Figure 7:
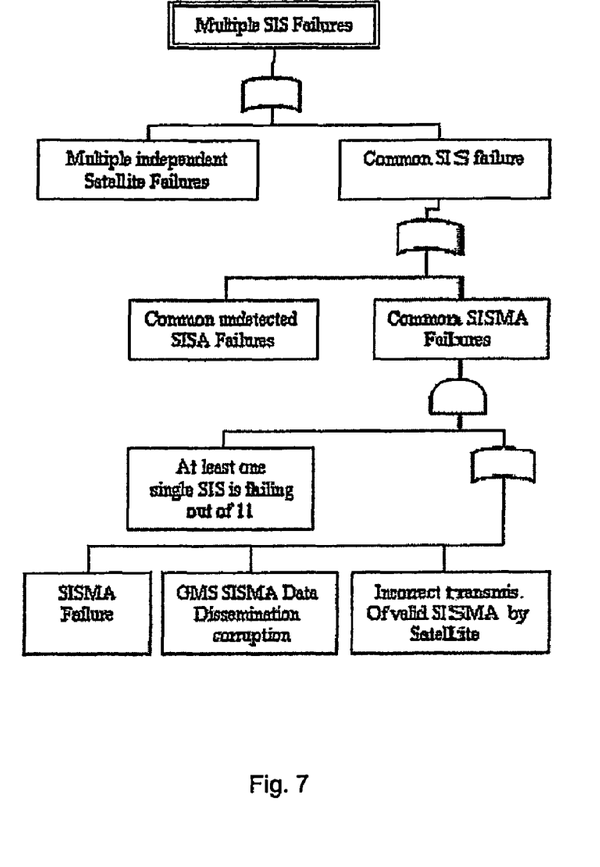
FIG. 7 shows a block diagram of the dissemination failure branch in more detail.

FIG. 7 illustrates in a more detailed block diagram the dissemination failure branch. The "Common Undetected SISA Failure" HMI contribution is allocated to internal GMS failures, leading to degraded OD&TS computation or SISA determination, so that the SISA value for at least one satellite is not properly bounding the SISE distribution in the fault-free case.

The "Common SISMA Failure" represents the hazardous situations due to monitoring errors. Such an event occurs when at least one SIS out of 11 is failing and if the SISMA determination fails, or if the SISMA information is corrupted caused by the GMS or the satellite.

Continuity Allocation Tree

Likewise the integrity allocation the system requirement for discontinuity has to be allocated at system level down to the segments.

Assumptions

To guarantee the required discontinuity of the integrity service two major conditions have to be met at the beginning of a continuity exposure time.

Independent links: at least two independent integrity links are received by the user. This is needed to ensure that the user receives integrity information (alerts) through the continuity interval (15 sec) even if one link fails (e.g. satellite, uplink or IPF failure).

Critical satellites: not more than a specified number of critical satellites are present in the current geometry. A critical satellite is defined as a satellite in the current user geometry whose loss or exclusion will unconditionally lead to exceed the tolerated HMI probability threshold in any integrity critical operation period. Thus, the loss of a critical satellite will lead to the generation of a "Don't Use" alert so that the current critical operation is immediately interrupted.

Top Level Allocation

Figure 8:
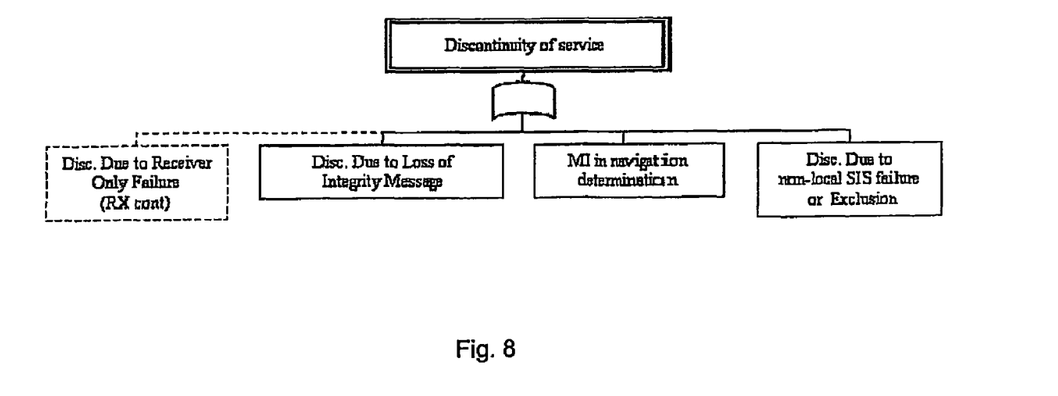
FIG. 8 shows a block diagram of the top level continuity allocation.

FIG. 8 illustrates the top level allocation for the required discontinuity of service.

The top level hazard "Discontinuity of Service" represents the condition where a critical operation has to be interrupted due to the occurrence of a system event unpredictable at the beginning of a critical operation. Such critical discontinuity conditions are met if one of the following feared events occurs.

"Discontinuity due to Receiver only Failure": discontinuity according to a receiver failure (likewise the integrity allocation just illustrated for a complete figure).

"Discontinuity due to Loss of Integrity Message": this event accounts the loss of the provision of integrity message to a user located at an arbitrary location within the service volume.

"MI in Navigation Determination": this event represents the conditions where misleading signals are excluded from the position solution (true alerts). The rate of these true alerts are driven by the probability of occurrence of the feared event "MI in Navigation Determination" in any continuity critical operation period, as the detectability of this feared event by the IPF algorithm is conservatively assumed to be 100%.

"Discontinuity due to non-local SIS Failure or Exclusion": this event represents the discontinuity contribution due to non-local failures that could independently lead to loss or exclusion of a single signal, to an extent where the remaining geometry is insufficient to keep the HMI probability below the allowed value.

Following the branches for the loss of the integrity message and SIS failure respectively exclusion are described in more detail to outline the covered events that might lead to discontinuity.

Loss of Integrity Message

The feared event "Discontinuity due to Loss of Integrity Message" reflects the loss of the provision of integrity message to a user located at an arbitrary location within the service volume. This appears if the Integrity data determination failure for multiple satellites or if the redundant integrity link is lost.

Figure 9:
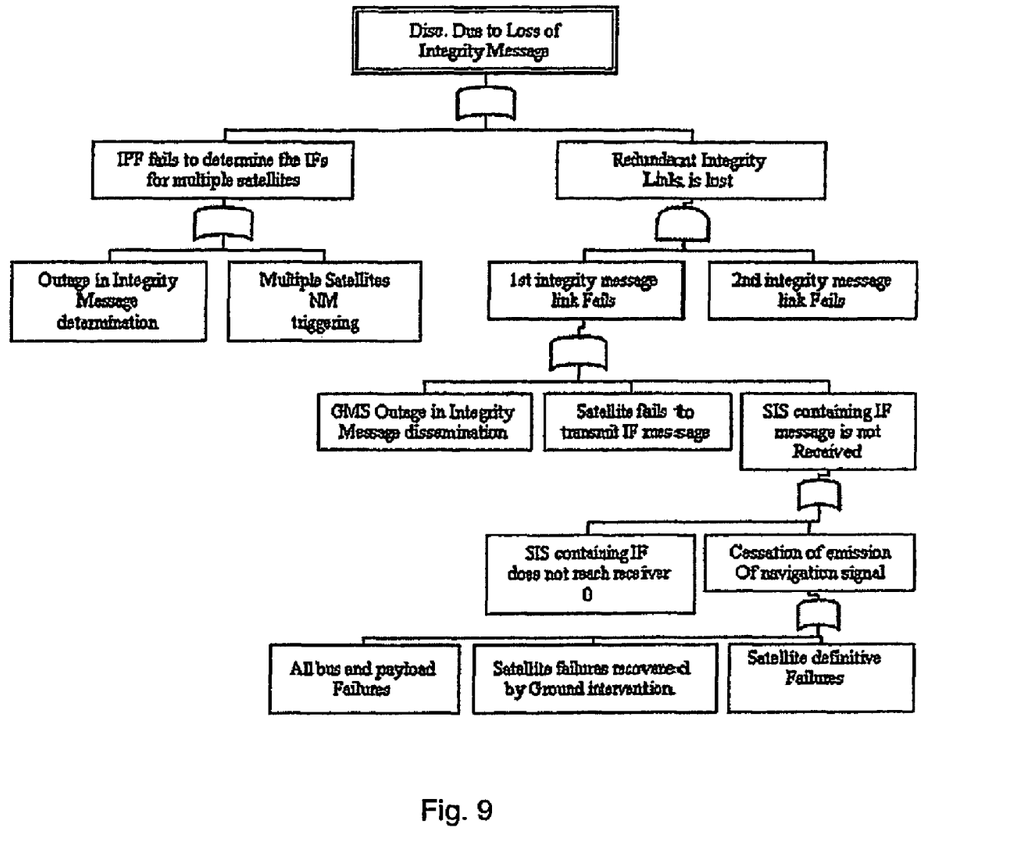
FIG. 9 shows a block diagram of the loss of integrity message allocation.

FIG. 9 illustrates the further allocation for the loss of integrity message down to segment level.

The loss within the critical operational period of integrity data determination function occurs when either the Galileo Mission Segment (GMS) fails to provide the integrity information, or fails to provide it with the required SISMA performances.

The right branch is associated to the loss of the integrity message due to link failures.

At least two links are required at the beginning of a critical operation, as the probability to lose a link during a critical operation is already higher than the total continuity risk. If the user has two links at the beginning he is allowed to continue, even if one is lost. The integrity links are independent under the condition that independent elements are used to provide the integrity information to the user.

A link failure can occur if the GMS fails to uplink the integrity messages or if the link gets lost according to satellite failures.

SIS Failure or Exclusion

The feared event "Discontinuity due to non-local SIS Failure or Exclusion" represents the discontinuity contribution due to non-local failures that could independently lead to loss or exclusion of single signal, to an extent where the remaining geometry is insufficient to keep the HMI probability in any 150 s below the allowed value.

The user geometry under which the system is declared available can contain up to six independent critical signals, which are equally critical for maintaining the HMI probability below the tolerated value. When one of the critical signals is lost, the HMI probability exceeds the specified value and the user has to interrupt his operation. This means that the contribution to service discontinuity has to be computed as 6 times the failure rate allocated to independent single signals.

Figure 10:
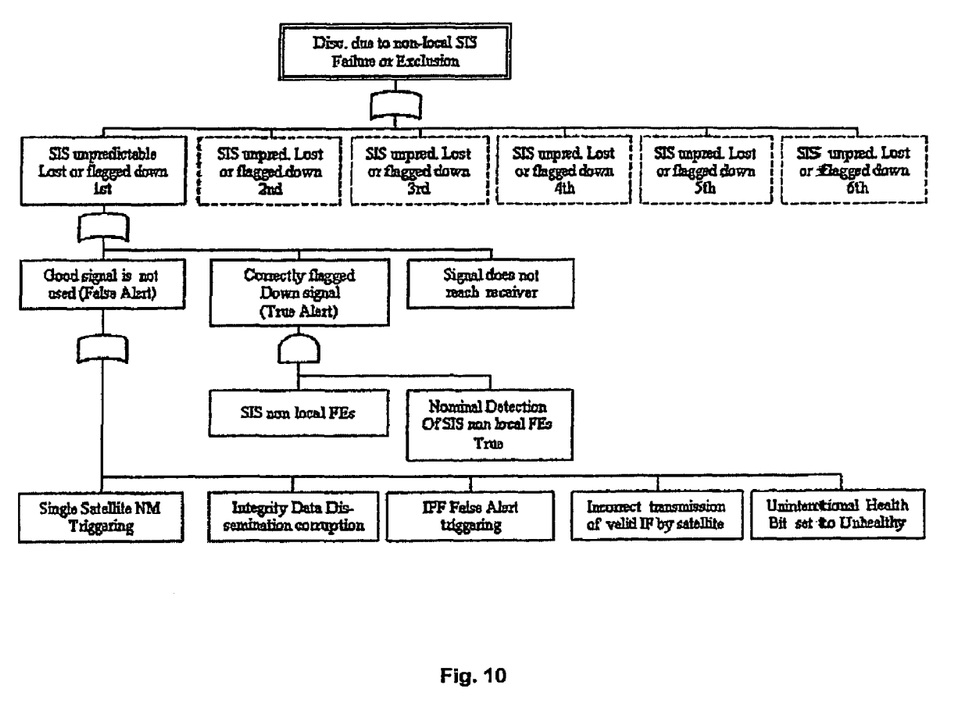
FIG. 10 shows a block diagram if the SIS failure or exclusion allocation.

FIG. 10 illustrates the branch for SIS failure or exclusion that might lead to discontinuity of service. The concept of 6 critical satellites is illustrated below the top level "Discontinuity due to non-local SIS Failure or Exclusion" box.

The branch "Good signal is not used (False Alert)" reflects discontinuity occurring when a correct signal is unpredictably excluded during a critical operation.

The branch "Correctly Flagged Down Signal (True Alert)" takes into account IPF algorithm true alerts triggered by the independent single SIS MI failures.

The box that the "Signal does not reach receiver" is equal to the "SIS Containing IF Message is not Received" FE as illustrated in FIG. 9.

Availability

For the service mean availability performance the approach is to define appropriate Galileo system states and to characterize the probability for the system to be in each state as well as the service availability at user level for each of these states. The latter parameter is defined as the percentage of time at worst user location for which a specified availability criteria is satisfied, so that a user can take a positive decision to start a critical operation.

The service mean availability performance is then achieved as the sum of the availability obtained for each system state, weighted by the corresponding state probability. The characterization of the service mean availability performance thus requires the assessment of both probabilistic performances relevant to unpredictable events which determine the state probabilities and deterministic (predictable) service availability performance in given system states depending on the signal geometry.

The assessment of the navigation service performance requirements (in terms of integrity, continuity and availability) will be finally achieved by verifying (through Service Volume simulation) that the specified SOL service 99.5% mean availability requirement can be met. In order to declare at a given point in time and space the service availability at user level, both continuity and integrity performances must be met.

User Integrity Algorithm

Availability of Integrity

At each position solution fixing epoch, a user will be allowed to start a critical operation whenever the following conditions are simultaneously satisfied.

The Galileo receiver is able to provide a Navigation Solution.
The Galileo receiver is able to predict the integrity performance and continuity performance.
The probability of HMI predicted over the next critical operation period does not exceed the specified value.
The probability of service discontinuity predicted over the next critical operation period does not exceed the specified value.
The integrity message is received through at least two independent satellite paths.

The determination of the service availability at user level implies that the user must be able to predict, at each position solution fixing epoch, its own service integrity performance and continuity performance. To this end, a specific algorithm runs inside the user receiver. It generates the following output messages to the user.

"Normal Operation" message whenever the above-mentioned conditions are simultaneously satisfied.
"Don't Use" alert message whenever the predicted HMI probability exceeds the specified value or no integrity message is received by the user receiver. In this case the user shall immediately stop the current operation which contributes to the overall discontinuity.
"Don't Initiate" message whenever the non-integrity is below the specified value but the predicted discontinuity risk exceeds the allowed value or one and only one integrity message is received by the user receiver. In this case the user will be not allowed to initiate a critical operation but a user who already started a critical operation is allowed to end it.

The rule applied by the user receiver to determine whether the service is available at a certain point in time is as follows.
1. The computed HMI probability is below the tolerated value.
2. The number of critical satellites over the next continuity critical operation period is not higher than a specified value.

More details about the user integrity algorithm can be found in the following section.

Algorithm Functionalities

According to the necessary functionalities the user integrity algorithm has to provide the following functions at every epoch.
1. check that the integrity information received for every integrity data stream is the integrity information generated by the integrity function of the ground infrastructure;
2. select out of the redundant and positively checked integrity data-streams the integrity data stream to be used;
3. determine from the selected and positive checked integrity information and the navigation information which signals are valid;
4. considering only valid signals, compute the integrity risk at the alert limit for the critical operation period;
5. considering only satellites that provide valid signals compute the number of critical satellites for the critical operation period;
6. generate the following alerts for the user
"Normal Operation" (The user is allowed to start to use the system for an operation as well as to continue to use it for an operation that has already started.)
"Don't Use" (The user is not allowed to start to use the system for an operation, and must discontinue to use it for an operation that has already started.)
"Don't Initiate" (The user is not allowed to start to use the system for an operation but is allowed to continue to use it for an operation that has already started.)

Integrity information Validation

The integrity information generated by the integrity function of the ground segment is signed (authenticated) so that it can be validated by the user receiver. This validation has to be performed in the integrity information validation function. The validation will ensure that only integrity information that was not changed at all or that was changed during dissemination with the allocated probability will be positively checked.

The validation information is provided in the integrity information data stream to the user receiver at every epoch, even if no other integrity information is broadcast to the user. This allows the user to determine at any epoch whether all integrity information has been received or not.

The validation will be performed for every integrity data stream that the user receiver will receive during nominal operation. There are at least two independent data streams that the user receiver receives.

Integrity information Selection

Out of the positively checked integrity information data streams the user receiver has to select one integrity data stream to be used for further processing. This will normally be the same integrity data stream used at the epoch before.

The integrity information from one of the other positively checked data streams will only be used, if the integrity data stream selected at the epoch before is no longer available or if it is predicted that the integrity data stream selected at the epoch before will be not available for at least one epoch during the integrity exposure time.

If both streams are positively checked at the beginning of the operation one of them has arbitrary to be selected.

Valid Signal Determination

The valid signals to be used are all the signals that are predicted to be received above the defined masking angle, that are received by the user receiver, and that have
1. the satellite health status flag not set to "unhealthy",
2. the integrity flag not set to "don't use" in the one selected integrity data stream,
3. the integrity flag not set to "not monitored" in the one selected integrity data stream,
4. the user receiver has not detected internally any of the following conditions:
AGC in bad status (over-range)
PLL not locked
Navigation message parity error
Invalid Issue of Data Ephemeris error (in eccentricity, mean anomaly ... out of range, no ephemeris received, ... )
Almanac invalid
Watch-dog expired
Satellite in bad Health
SW integrity check results (incorrect SW checksum)
Ionospheric correction unavailable (for one satellite, measurements on one frequency only)
Internal computations error (elevation, satellite coordinates ... )
Clock models invalid
Excessive interference (user configurable)
Excessive multipath (user configurable)

Integrity Risk Calculation

The Integrity risk is computed according to the formulas given in section User Integrity Equation and in accordance with the integrity allocation tree given in the above section "System performance allocation".

Critical Satellites

A critical satellite is defined as a satellite in the user geometry that is essential to keep the Integrity Risk at the Alert Limit below the specification. So there has to be a function in the user receiver to determine the number of critical satellites in the user geometry.

The number of critical satellites is assessed by computing the integrity risk at the alert limit for all predictable user geometries where one valid signal is missing. The number of critical satellites is the number of satellites which causes the integrity risk at the alert limit to be higher than the allocated integrity risk if this satellite is removed.

Navigation Warning Algorithm

The Navigation Warning Algorithm is to provide the implementation of the set of rules, in order to decide whether or not the navigation service with integrity is available at the current epoch To, as well as to predict its availability for the incoming critical period Tc. To this end, this algorithm shall provide three levels of outputs, namely:

1. "normal operation" or "use" message, which indicates that the navigation service is available at epoch To, and foreseen to be available over the next critical operation period with the required level of end-to-end performance. In this condition the user is enabled to start or continue operations at epoch To.
2. "don't initiate" warning message, which indicates that the system is available at epoch To, but discontinuity risk is not guaranteed to be acceptably low in the next critical operation period. This warning message indicates that a critical operation (e.g. aircraft approach) must not be commenced, but a user will be permitted to finish his current Critical Operation.
3. "don't use" alert, which indicates that the user must instantly abort its current critical operation because the HMI probability exceeds the specified value or the PVT (position, velocity, and time) solution is lost.

"Normal Operation" Message
The Navigation Warning Algorithm shall be able to generate, at each decision fixing epoch To, a "normal operation" message whenever the following conditions are simultaneously satisfied.
1. At least two integrity data streams are available at instant To.
2. A PVT algorithm solution is available at instant To (no PVT Algorithm Alert is present).
3. A HMI Probability Computation solution is available at instant To (no HMI Algorithm Alert is present).
4. The HMI Probability in any 150 s predicted at epoch To through the relevant algorithm does not exceed the specified HMI probability threshold.
5. It is predicted that at least two integrity message will be continuously available over the subsequent critical operation period.
6. It is predicted that not more than 6 satellites are critical.

"Don't Use" Message
The Navigation Warning Algorithm must be able to generate, at each position fixing epoch To, an alert to the user to instantly abort the current operation ("don't use" alert) if the one of the following conditions occurs (OR):
1. No integrity link message is available at the epoch To, or it is predicted that no integrity link will be available at some epoch over the subsequent critical operation period.
2. Alert from PVT Algorithm indicating that a PVT solution is not available.
3. Alert from HMI Probability Computation Algorithm indicating that HMI Probability is not available.
4. The HMI Probability in any 150 s predicted at epoch To through the relevant algorithm exceeds the specified HMI probability threshold.
5. The at least two SISMA increase alerts, one multiple SISMA increase alert were sent via the integrity data stream for a satellite since the start of critical operation and the resulting HMI Probability the specified HMI probability threshold.

"Don't Initiate" Warning
A "don't initiate" warning has to be generated when the following conditions are simultaneously satisfied, at a given position fixing epoch (AND):
1. A position velocity time (PVT) algorithm solution is available at instant To (no PVT Algorithm Alert is present).
2. The HMI Probability is available at instant To (no HMI Computation Alert is present).
3. If the HMI Probability in any 150 s predicted at epoch To through the relevant algorithm does not exceed the specified HMI probability threshold the Navigation Warning Algorithm shall be able to generate a "don't initiate" message whenever at least one of the following conditions is verified (OR):
    one and only one integrity link message is available at To, and foreseen to be available over the next critical operation period
    the number of critical satellites can not be determined at To (a Critical Satellite Prediction Algorithm Alert is present)
    More than six satellites are critical over the next critical operation period

Algorithm Flow Chart

Figure 11:
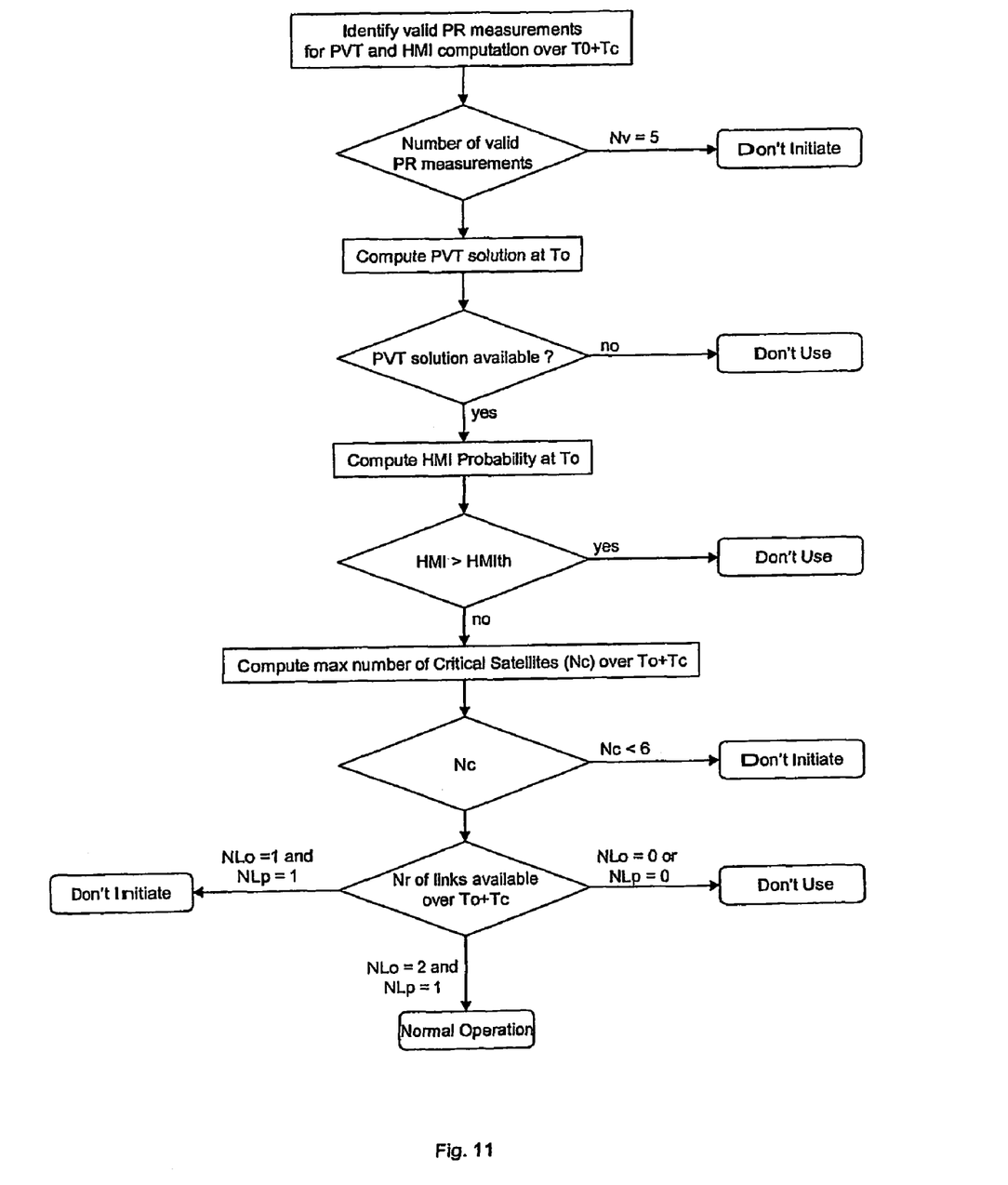
FIG. 11 shows a flow chart of the navigation warning algorithm

FIG. 11 illustrates the compete flow chart for the navigation warning algorithm.

This figure summarises the events that lead to the various navigation warnings "Don't Use", "Don't Initiate", and "Nominal Operations" including the single algorithm functionalities.

Further Comments

According to the specifications for a standard user receiver and the corresponding nominal environment the described overall integrity concept guarantees the required performances for the mentioned nominal specifications respectively if the user operates in the corresponding environment.

Further of barriers have to be implemented at user level for the protection against excessive local phenomena (e.g. RAIM algorithm) but this is out of the scope of the present document.

Summary

The invention provides a global integrity satellite navigation system and an integrity concept including the necessary monitoring capabilities. Beside the monitoring capability that will be provided by the system to exclude faulty satellites the presented integrity concept accounts also for the limited monitoring capabilities that is present in any integrity system by considering one faulty satellite that is not detected by the monitoring system in the integrity risk computation at user level.

Four failure mechanisms have been considered in the user integrity equations: horizontal, vertical and for each of them fault-free and one undetected error. Unlike present SBAS concepts, no fix allocation between the failure mechanisms could be made to avoid too complex ground infrastructures. The combined integrity risk can be calculated directly at the Alert Limit and can be compared to the corresponding specification. This concept is included in the overall integrity allocation and the impact of the combined integrity risk calculation has been compared to the typical fix allocation approach.

To guarantee the availability of service a concept of critical satellites has been introduced where the number of critical satellites is the number of satellites which causes the integrity risk at the alert limit to be higher than the allocated integrity risk if this satellite is removed. Beside further feared events the complete continuity allocation tree has been described.

According to the described integrity concept the user algorithm has to implement various functionalities which have been described in detail.

To summarize, an integrity concept has been developed and described for the available Galileo architecture that is able to guarantee the demanding integrity and continuity requirements with an unavailability of 0.5% that is one order of magnitude higher than all other known SBAS concepts (typical 5% unavailability).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

ABBREVIATIONS

AL Alert Limit
CS Critical Satellite
ERIS External Regional Integrity Services
eSISE Estimated Signal in Space Error
FE Feared Event
GSRD Galileo System Requirement Document
GCS Galileo Control Station
GMS Galileo Mission Segment
GSS Galileo Sensor Station
HMI Hazardous Misleading Information
HPL Horizontal Protection Level
IF Integrity Flag
IR Integrity Risk
MEO Medium Earth Orbit
MI Misleading Information
OS Open Service
PL Protection Level
PRS Public Regulated Service
PVT Position Velocity Time
RNSS Radio Navigation Satellite Service
SAR Search-and-Rescue
SBAS Space Based Augmentation System
SIS Signal-in-Space
SISA Signal in Space Accuracy
SISE Signal in Space Error
SISMA Signal in Space Monitoring Accuracy
SoL Safety-of-Live Service
SV Space Vehicle
SVS Service Volume Simulation
TH Threshold
TTA Time-to-Alert
ULS Uplink Station
VPL Vertical Protection Level
WAAS Wide Area Augmentation System

The invention claimed is:

1. A method for providing integrity information for users of a global navigation system, said method comprising:
   a plurality of space vehicles transmitting information to a user device for position detection; wherein the transmitted information includes,
   a first information from the global navigation system about the accuracy of a signal in space error SISE of a faulty space vehicle; and
   a second information that specifies whether or not the global navigation system assesses the faulty space vehicle as faulty; wherein
   the first information comprises:
      information about the quality of a signal in space SIS broadcast by the space vehicles, which is called signal in space accuracy SISA and corresponds to a prediction of a width of a statistical distribution of SISE;
      information about accuracy of a monitoring of the signal in space SIS broadcast by the space vehicles by a ground segment of the global navigation system, which is called signal in space monitoring accuracy SISMA and corresponds to a width of a statistical distribution of a difference between an estimated and a true value of SISE; and
   the second information comprises:
      information about a signal in space SIS broadcast by space vehicles, which should not be used, which is called integrity flag IF.

2. The method according to claim 1, wherein a navigation message is disseminated to the device for position detection which includes values of the SISA.

3. The method according to claim 1, wherein an integrity message is disseminated to the device for position detection which includes a table containing a value of the SISMA and an integrity flag IF for each SIS.

4. The method according to claim 2, wherein the navigation and the integrity message are updated each 30 seconds.

5. A user device for position detection by means of a global navigation system in which a plurality of space vehicles transmit information to the device for determining the position of the device in space; wherein the device comprises:
   receiving means, in the user device, for receiving an integrity information that includes a first information from the global navigation system about the accuracy of a signal in space error SISE of a faulty space vehicle; and a second information that specifies whether or not the global navigation system assesses the faulty space vehicle as faulty; wherein the first information comprises:
information about the quality of a signal in space SIS broadcast by the space vehicles, which is called signal in space accuracy SISA and corresponds to a prediction of a width of a statistical distribution of SISE;
information about accuracy of a monitoring of the signal in space SIS broadcast by the space vehicles by a ground segment of the global navigation system, which is called signal in space monitoring accuracy SISMA and corresponds to a width of a statistical distribution of a difference between an estimated and a true value of SISE; and the second information comprises:
information about a signal in space SIS broadcast by space vehicles, which should not be used, which is called integrity flag IF;
processing means, in the user device, for calculating an integrity risk from the received first and second information, and from further information, wherein said integrity risk being a measure of the probability that a user should have been warned that said global navigation system should not be used for navigation, without having been warned; and
alert means, in the user device, for raising an alert if the calculated integrity risk is larger than an allowed integrity risk.

6. The device according to claim 5, wherein the processing means are adapted for calculating the integrity risk for a given alert limit which is the maximum allowed position deviation for which no alert has to be raised.

7. The device according to claim 6, wherein for calculation of the integrity risk it is assumed that all distribution used for the calculation are Gaussian distributions.

8. The device according to claim 5, wherein said further information comprises relative geometry between the device for position detection and a space vehicle, error budgets for the signal in space SIS including propagation errors, reception errors and errors of the SIS broadcast by the space vehicles, and integrity flags IFs.

9. The device according to claim 8, wherein, for errors of the SIS broadcast by the space vehicles, it is assumed that for a non fault-free space vehicle the distribution of the difference between the error of the SIS broadcast by the space vehicles and an integrity flag threshold is over-bound by a Gaussian distribution with standard deviation signal in space monitoring accuracy SISMA.

10. The device according to claim 5, wherein the device is adapted for calculating the integrity risk as the sum of the horizontal integrity risk $P_{IntRisk,H}$ and the vertical integrity risk $P_{IntRisk,V}$.

11. A method for determining integrity risk of information disseminated from space vehicles in a global navigation system which provides integrity information that includes a first information from the global navigation system about the accuracy of a signal in space error SISE of a faulty space vehicle; and a second information that specifies whether or not the global navigation system assesses the faulty space vehicle as faulty; said method comprising:
checking that the integrity information received for every integrity data stream is the integrity information generated by the integrity function of the ground infrastructure;
selecting out of redundant and positively checked integrity data-streams the integrity data stream to be used;
determining from selected and positive checked integrity information and the navigation information which signals are valid;
computing an integrity risk at the alert limit for the critical operation period wherein only valid signals are considered; and
computing a number of critical space vehicles for the critical operation period, considering only space vehicles that provide valid signals; and
generating an alert for the user which indicates whether or not the received information should be used for position detection;
wherein said integrity information comprises:
information about the quality of a signal in space SIS broadcast by the space vehicles, which is called signal in space accuracy SISA and corresponds to a prediction of a width of a statistical distribution of SISE;
information about accuracy of a monitoring of the signal in space SIS broadcast by the space vehicles by a ground segment of the global navigation system, which is called signal in space monitoring accuracy SISMA and corresponds to a width of a statistical distribution of a difference between an estimated and a true value of SISE; and
information about a signal in space SIS broadcast by space vehicles, which should not be used, which is called integrity flag IF;
wherein said integrity risk is a measure of the probability that a user should have been warned that said global navigation system should not be used for navigation, without having been warned;
and wherein said method is carried out by a user device for position detection.

12. The method according to claim 11, wherein the integrity information generated by the integrity function of the ground infrastructure is signed so that it can be validated by a receiver.

13. The method according to claim 1, wherein:
SISE is a maximum range error of the signal in space SIS, which is unknown and cannot be measured directly;
SISA is a prediction of the minimum standard deviation of a Gaussian distribution that overbounds the SISE distribution for fault-free SIS; and
SISMA is a minimal value of a standard deviation of a Gaussian distribution that overbounds a statistical distribution of a difference between an estimated SISE and a true SISE.

14. The device according to claim 5, wherein:
SISE is a maximum range error of the signal in space SIS, which is unknown and cannot be measured directly;
SISA is a prediction of the minimum standard deviation of a Gaussian distribution that overbounds the SISE distribution for fault-free SIS; and
SISMA is a minimal value of a standard deviation of a Gaussian distribution that overbounds a statistical distribution of a difference between an estimated SISE and a true SISE.

15. The method according to claim 11, wherein:
SISE is a maximum range error of the signal in space SIS, which is unknown and cannot be measured directly;
SISA is a prediction of the minimum standard deviation of a Gaussian distribution that overbounds the SISE distribution for fault-free SIS; and
SISMA is a minimal value of a standard deviation of a Gaussian distribution that overbounds a statistical distribution of a difference between an estimated SISE and a true SISE.

* * * * *